United States Patent [15] 3,636,362
Beeman et al. [45] Jan. 18, 1972

[54] DEVICE FOR MEASURING HOLE SIZES

[72] Inventors: James F. Beeman, 1754 N. W. 61st Terrace, Gainesville, Fla. 32601; Glenn H. Roberts, R.D. #1, Towanda, Pa. 18848; Charles W. Smith, R.D. #2, Ulster, Pa. 18850

[22] Filed: Aug. 14, 1970

[21] Appl. No.: 63,744

[52] U.S. Cl. ...................... 250/219 FR, 250/222, 250/227, 356/167, 356/237
[51] Int. Cl. ........................................................ G01n 21/30
[58] Field of Search .................. 250/219 R, 219 D, 224, 234, 250/219 F, 219 DF, 219 DR, 221, 222, 201, 202; 356/156, 158, 165, 167, 168, 171, 237, 239; 324/71

[56] References Cited

UNITED STATES PATENTS 3,457,422  7/1969  Rottman ............................. 356/167
3,532,893  10/1970  Marantette ........................ 250/219 D

*Primary Examiner*—James W. Lawrence
*Assistant Examiner*—D. C. Nelms
*Attorney*—Norman J. O'Malley, Donald R. Castle and William H. McNeill

[57] ABSTRACT

A device for measuring the size of apertures in a thin metal sheet having a table that can rotate, preferably in a stepwise manner, and having the sheet to be measured and a standard sheet mounted over openings in the table. A light source is conducted to a movable head and a stationary head. Phototubes in registry with the heads provide two electrical currents, one that is generated from light which has not passed through the sheet and one generated from light that has passed through either the standard or the sheet to be measured. A means for comparing the two currents provides a highly accurate measurement of the hole sizes since the device compensates for changes in light source intensity due to external factors. The device is particularly suited for measuring the size of holes where a high degree of accuracy is required such as in television aperture masks, fine mesh screens and the like.

7 Claims, 2 Drawing Figures

INVENTORS
JAMES F. BEEMAN,
GLENN H. ROBERTS, &
CHARLES W. SMITH

BY Donald R. Castle
ATTORNEY

INVENTORS.
JAMES F. BEEMAN,
GLENN H. ROBERTS, &
CHARLES W. SMITH

BY Donald R. Castle

ATTORNEY

DEVICE FOR MEASURING HOLE SIZES

BACKGROUND OF THE INVENTION

This invention relates to a device for measuring the size of holes in thin metal sheet. More particularly, it relates to a photoelectric device that is extremely accurate in measuring hole sizes and is capable of measuring any segment of the sheet in detail.

In many instances close tolerance of apertures in metal sheets is required. Slight deviations from the desired size can cause problems in subsequent uses of the sheet containing the apertures. For example, in color television aperture masks close tolerance of the holes therein is required to insure that proper dot formation and excitation occurs.

In devices heretofore used for measuring hole sizes, generally the size was measured at one particular point. While this method is useful in indicating major defects in some instances further checks are desirable. Variations in the metal can cause variations in the size of holes even with the same segment of metal sheet. The variations can be acute when chemical etching is used to produce the apertures because changes in composition within the same segment of sheet can result in different etching rates.

When the sizes of holes are relatively small and where there are numerous holes in a given sheet, photoelectric measuring means affords a good method of measuring. The light that passes through a sheet is in direct relation to the size of the hole. Comparison to a standard wherein the sizes of holes are known affords a means for determining the accuracy achieved in making apertures of the desired size. In the devices heretofore known, however, there has been no compensation for changes in the intensity of the light source that can result from changes in the line voltage supplying the lamp, lamp aging, or other factors.

It is believed, therefore, that a device using photoelectric measuring that can scan any segment of the apertured sheet and compensate for changes in the light intensity would be an advancement in the art.

SUMMARY OF THE INVENTION

In accordance with one aspect of this invention there is provided a device for measuring the size of apertures in a thin metal sheet. The device comprises a rotatable table with two openings over which the test sheet and a standard are mounted, a light source, a movable head comprising a light-conducting means focusing light from the light source on one side of the table and a phototube on the opposite side of the table and in registry with the light-conducting means. The phototube converts the light received into a first electrical current. A stationary head is provided external to said table and comprising a light-conducting means for focusing light from the light source on a second phototube that converts the light received into a second electrical current. The first and second currents are compared to compensate for changes in intensity of the light source. Standard current levels are obtained from the standard and a comparison of the current levels of the first current developed from the light passed through the test material and the current developed from the light passed through the standard after compensation for changes in intensity of the light source affords an extremely accurate determination of the size of the apertures.

For a better understanding of the present invention, together with other and further objects, advantages, and capabilities thereof, reference is made to the following disclosure and appended claims in connection with the above-described drawings.

DESCRIPTION OF THE PREFERRED EMBODIMENTS

Figure 1:
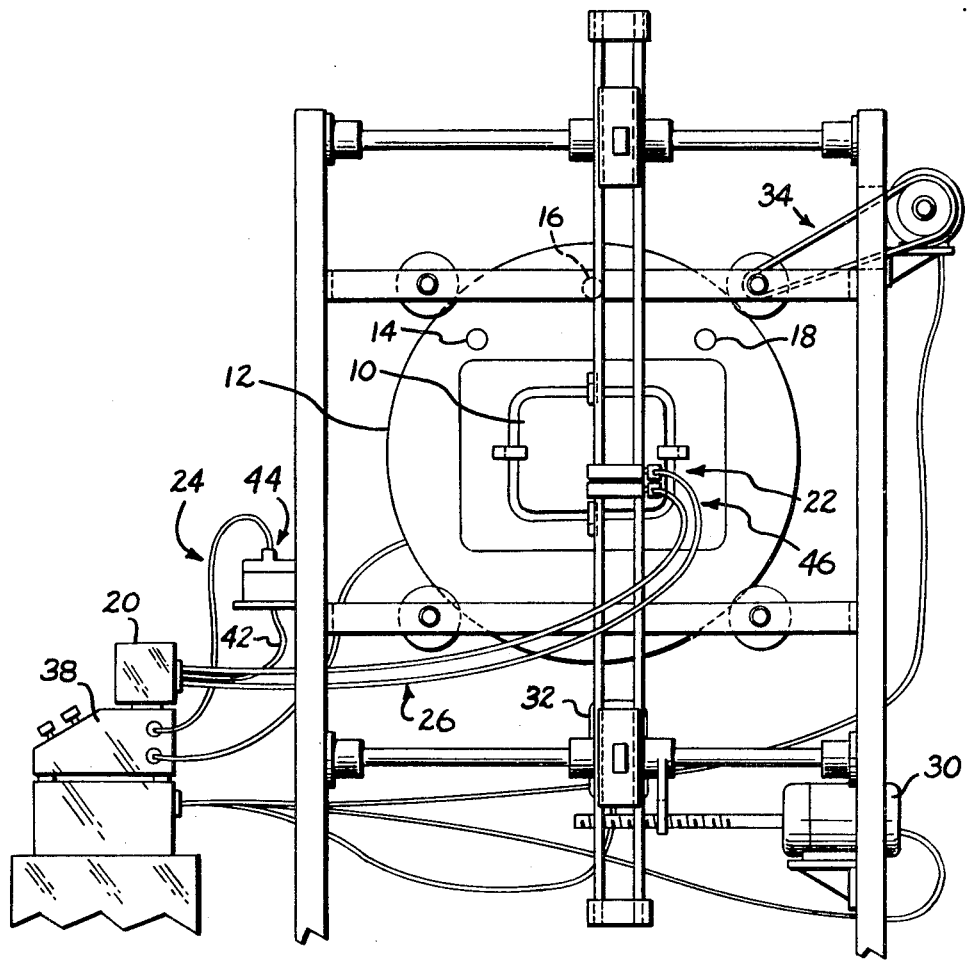
FIG. 1 is a side view of the device of this invention.
Figure 2:
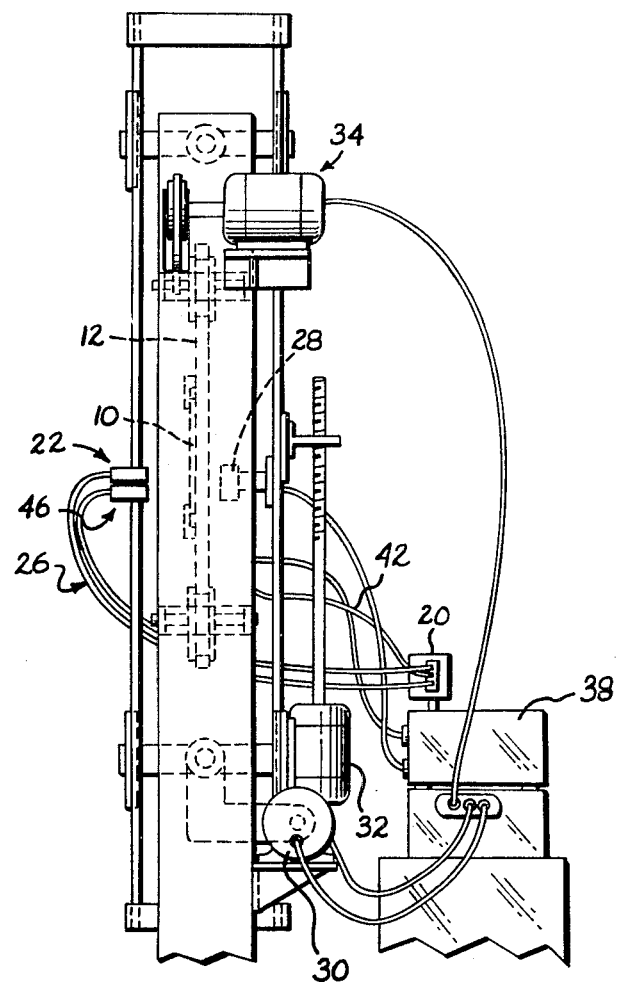
FIG. 2 is an end view of the device of this invention.

With particular reference to FIGS. 1 and 2 a thin sheet 10 such as a television aperture mask, which is to be tested for the size of aperture is mounted on the table 12 over the first apertures therein. Standard samples 14, 16 and 18 are mounted over second apertures in the table 12. Although in the embodiment shown a plurality of standard samples are used, in this instance three, in some instances one standard is sufficient particularly if the apertures or openings in the thin sheet are to be uniform throughout. In the particular embodiment shown an aperture mask for color television is tested, and the size of openings vary. It is desirable to have larger openings at the outer edges than in the center of the mask. A light source 20 provides light to a movable head 22 and a stationary head 24. The movable head 22 comprises a light-conducting means 26 and phototube 28 in registry with the movable head 22. The driving means 30 and 32 provide vertical and horizontal movement respectively to the movable head 22 enabling it to be moved to substantially any point on the table 12. Driving means 34 provides rotation to the table 12. The phototube 28 converts the light passing through the thin sheet 10 into an electric current which is fed to an indicator or recorder 38. A second head 24 comprising a light-conducting means 42 and a second phototube 44 converts the total light output of the light source 20 into an electric current which is also fed to the indicator or recorder 38. Changes in intensity of the light source 20 are compensated for by comparing the currents from both phototubes. In the embodiment shown a third head 46 is utilized. In television aperture masks it is useful because of the varying opening size. The third head 46 provides readings which indicate the variance in holes at the center to the edge. If desired, the rotation of the table 12 and the movement of the movable head 22 can be in a predetermined pattern so as to maximize the scan over the thin sheet 10 or to provide a set standard pattern of scan such as a spiral scanning movement. Generally, movement of the third head 46 is confined to either a horizontal or vertical direction. If desired, the electrical currents that are generated can be displayed in a variety of ways such as pen recorder and chart, direct readings as on a dial or any other type of display that is desired.

While there has been shown and described what are at present considered the preferred embodiments of the invention, it will be obvious to those skilled in the art that various changes and modifications may be made therein without departing from the scope of the invention as defined by the appended claims.

We claim:
1. A device for measuring the size of apertures in a thin metal sheet comprising:
  a. a rotatable table having first and second spaced-apart apertures and having means for mounting said thin metal sheet over said first aperture and means for mounting a standard apertured metal sheet over said second aperture,
  b. means for rotating said table,
  c. a light source,
  d. a movable head comprising a light-conducting means located on one side of said table for conducting light from said light source and a phototube for converting the light received into a first electric current, located on the opposing side of said table and in registry with light-conducting means, said head being horizontally and vertically movable,
  e. means for providing said movement to said first head and maintaining said registry,
  f. a stationary head external to said table and comprising a light-conducting means for conducting light from said light and a phototube in immediate registry with said light-conducting means for converting the light received into a second electric current, and
  g. means for comparing said first and second currents.
2. A device according to claim 1 wherein said currents generated by said phototubes are fed to a recorder.

3. A device according to claim 2 wherein said light-conducting means are fiber optic bundles.

4. A device according to claim 3 wherein a third head is provided on said table to enable measurement of the variation in hole size from center to edges of the apertured sheet.

5. A device according to claim 4 wherein said apertured metal sheet is a television aperture mask.

6. A device according to claim 5 wherein said table is rotated in a stepwise manner and said movable head is moved in a horizontal and vertical direction to yield a spiral scan on said aperture mask.

7. A device according to claim 6 wherein a plurality of standard apertured metal sheets are used.

* * * * *

PO-1050
(5/69)

UNITED STATES PATENT OFFICE
CERTIFICATE OF CORRECTION

Patent No. 3,636,362                    Dated    January 18, 1972

Inventor(s)   JAMES F. BEEMAN, GLENN H. ROBERTS and CHARLES W. SMITH

It is certified that error appears in the above-identified patent and that said Letters Patent are hereby corrected as shown below:

Please add the following to the front page:

[73] Assignee:  Sylvania Electric Products Inc.

Signed and sealed this 5th day of December 1972.

(SEAL)
Attest:

EDWARD M. FLETCHER, JR.                 ROBERT GOTTSCHALK
Attesting Officer                       Commissioner of Patents